No. 674,484. Patented May 21, 1901.
J. F. STEWARD.
TONGUE TRUCK FOR HARVESTERS.
(Application filed Feb. 13, 1901.)
(No Model.)
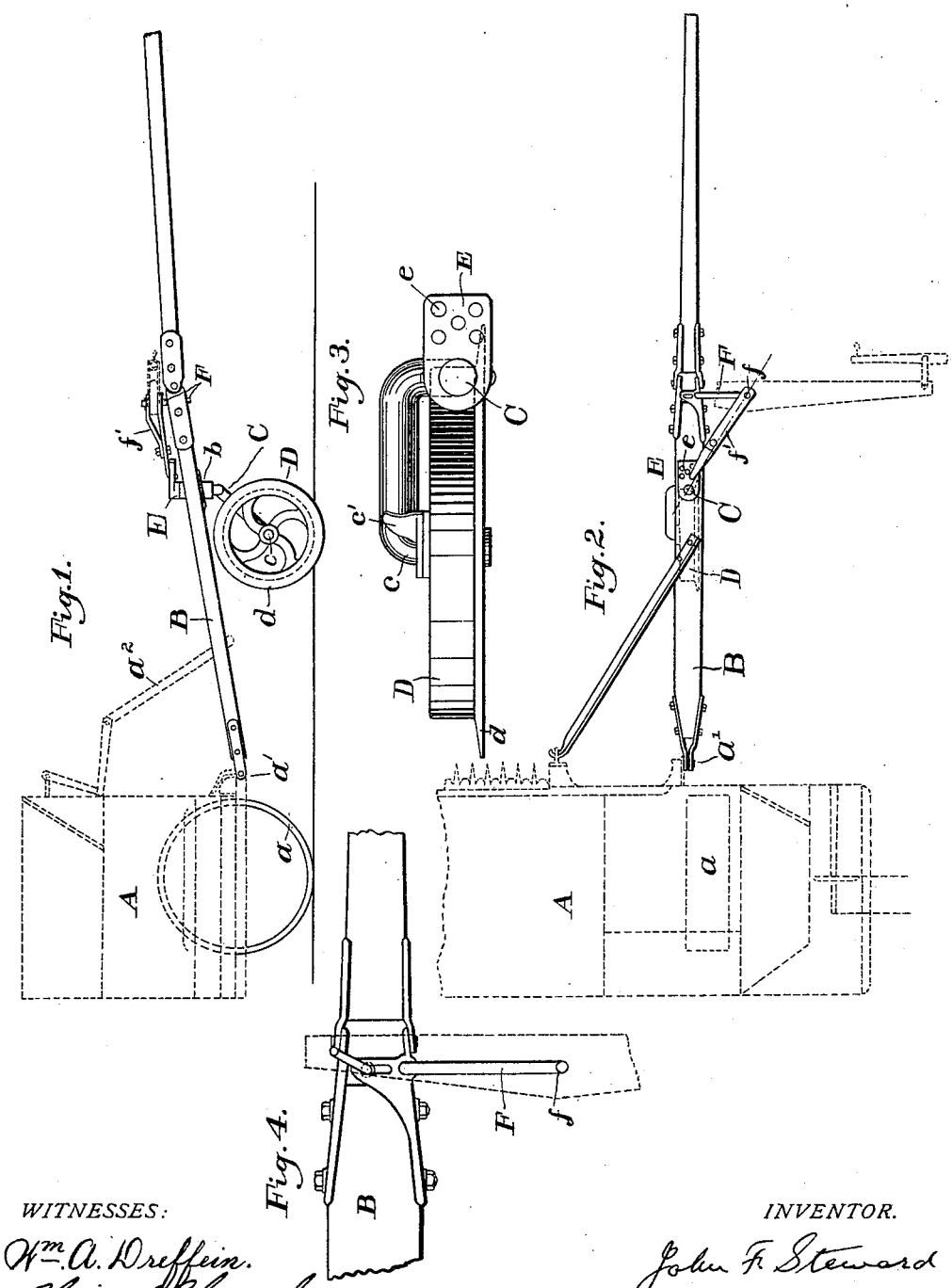
WITNESSES:
Wm. A. Dreffein.
Chas. W. Chambers.
INVENTOR.
John F. Steward

UNITED STATES PATENT OFFICE.

JOHN F. STEWARD, OF CHICAGO, ILLINOIS.

TONGUE-TRUCK FOR HARVESTERS.

SPECIFICATION forming part of Letters Patent No. 674,484, dated May 21, 1901.

Application filed February 13, 1901. Serial No. 47,147. (No model.)

*To all whom it may concern:*

Be it known that I, JOHN F. STEWARD, a citizen of the United States, residing at Chicago, in the county of Cook and State of Illinois, have invented certain new and useful Improvements in Tongue-Trucks for Harvesting and other Machines; and I do hereby declare the following to be a full, clear, and exact description of the invention, such as will enable others skilled in the art to which it appertains to make and use the same, reference being had to the accompanying drawings, forming a part of this specification, in which—

Figure 1 is a side elevation of a harvesting-machine, shown in outline, with my improved draft devices attached. Fig. 2 is a plan view of the same parts. Fig. 3 is a detail of the caster-wheel, and Fig. 4 the means for attaching the equalizer.

In the drawings, A represents the harvester-frame, and $a$ the supporting-wheel. At $a'$ the tongue B is pivoted. The tongue may be held in the desired angular position relative to the harvesting-machine by any of the usual tilting devices, as $a^2$.

In the drawing I have preferred to show the draft-tongue formed of two parts hinged together. As that forms no part of my invention, it need not be described, as its purpose will become apparent when speaking of the means for attaching the draft devices. Preferably passing through a strong sleeve $b$ in the tongue is the caster-arm C. This arm is from choice made of a single bar of iron, bent, as will be seen by reference to Figs. 1 and 3. It may be any form of caster arm or bracket. Upon the journal $c$ the caster-wheel D is placed in any suitable manner to turn freely. $c'$ is a washer secured from rotation by its lug coming in contact with the arm, as seen in Fig. 3.

The purpose of my invention is to reduce side draft incident to excessive width of cut of harvesting-machines. To accomplish this result, I make a caster-wheel of any form, but preferably provided with a large flange $d$, that will cut into the ground. Above the tongue, upon the stem of the caster-wheel, I place a crank-arm E, provided with several holes $e$, by means of which the effective length of the said arm may be varied at will. This arm is securely pinned to the pivot of the caster-arm. Extending stubbleward from the tongue is the vibrating arm F, as seen in Figs. 1, 2, and 4. The draft-equalizer is secured to this vibrating arm, preferably at the point $f$; but the vibrating arm, pivoted as it is to the tongue, is free to move back and forth at its outer end. In order to transmit the stress put upon the equalizers to the tongue of the machine, I use the link $f'$, which passes from the upturned end of that arm on which the draft-equalizer is placed backward to the arm E and hook it into any one of the holes, as desired. The wheel does not lose any of its functions as a caster-wheel because of being connected, as it is, to the draft devices, for if the team is backing there is no stress on the draft devices and the caster-wheel may turn freely, the only result being that the draft-equalizers will be moved rearward by it to a slight extent. In turning the machine short there is so little stress upon the draft devices that still the caster-wheel performs its office. By reference to Fig. 2 it will be seen that all of the holes in the arm E are grainward from a line drawn between the pivot $f$ of the vibrating arm F and the axis of the caster-arm C. The result of this is that the constant tendency of the draft of the team is to turn the plane of the caster-wheel from parallel relative to the line of advance and give it an inclination to run stubbleward, and thus counteract side draft. If the side draft is great, the link $f'$ may be hooked into that hole which will give the greatest leverage. I find, however, that but little leverage is required, and hence I make the arm E very short. Even with the link hooked into the hole, which increases the leverage most, the castering of the wheel is not affected in backing or turning short.

What I claim as my invention, and desire to secure by Letters Patent, is—

1. In a harvester or similar machine, a draft-tongue, a supporting-caster for said tongue, draft devices, and connections between said draft devices and said supporting-caster adapted to give the wheel of said caster a direction of travel stubbleward relative to the line of advance of the machine, substantially as described.

2. In a harvester or similar machine, a draft-tongue, a supporting-caster, the wheel of said caster having a deep flange, and the said caster supporting the tongue, draft devices and connections between said draft devices and said supporting-caster adapted to give the wheel of the said caster a direction of travel stubbleward relative to the line of advance of the machine, substantially as described.

3. In a harvester or similar machine, a draft-tongue, a supporting-caster for said tongue, a draft-equalizer supported on said tongue and given freedom of movement forward and backward, said caster having an arm on its axis, said draft devices connected to said arm, all combined substantially as described.

4. The combination with the draft-tongue of the supporting-caster having the arm E, the vibrating arm F pivoted to the tongue, the draft devices supported thereby, and the link $f'$, all combined substantially as described.

5. The combination with the draft-tongue of the supporting-caster having the arm E, said arm variable in its effective length, the vibratable arm F pivoted to the tongue, the draft devices supported thereby and the link $f'$, substantially as described.

6. The combination with the draft-tongue of the supporting-caster, the wheel portion of said caster provided with a deep flange, the said caster having the arm E, the vibratable arm F pivoted to the tongue, the draft devices supported thereby and the link $f'$, substantially as described.

In testimony whereof I affix my signature in the presence of two witnesses.

JOHN F. STEWARD.

Witnesses:
CHAS. N. CHAMBERS,
J. W. DAVIS.